United States Patent [19]
Nishino

[11] Patent Number: 5,319,546
[45] Date of Patent: Jun. 7, 1994

[54] ELECTRONIC CASH REGISTER FOR USE WITH A PLURALITY OF OUTPUT DEVICES HAVING DIFFERENT OUTPUT FORMATS

[75] Inventor: Takahisa Nishino, Kyoto, Japan

[73] Assignee: Omron Corporation, Kyoto, Japan

[21] Appl. No.: 669,956

[22] Filed: Mar. 15, 1991

[30] Foreign Application Priority Data

Mar. 20, 1990 [JP] Japan .................................. 2-70844

[51] Int. Cl.⁵ ............................................. G06G 1/12
[52] U.S. Cl. ................................... 364/405; 395/148; 395/145
[58] Field of Search .................. 364/405, 419, 709.01, 364/519, 518; 395/148, 145; 235/378, 383

[56] References Cited

U.S. PATENT DOCUMENTS

| | | | |
|---|---|---|---|
| 4,508,962 | 4/1985 | Yamasaki | 364/405 |
| 4,712,929 | 12/1987 | Kitaoka | 395/148 |
| 4,847,762 | 7/1989 | Suzuki | 364/405 |
| 5,081,579 | 1/1992 | Komai et al. | 364/405 |

OTHER PUBLICATIONS

Karen L. Acerson, WordPerfect, The Complete Reference pp. 287-288; 604-613; 751-755; 973-987 by McGraw Hill.

Primary Examiner—Roy N. Envall, Jr.
Assistant Examiner—Frantzy Poinvil
Attorney, Agent, or Firm—Dickstein, Shapiro & Morin

[57] ABSTRACT

An electronic cash register (ECR) which may be connected to different output devices having different output formats such as different characters per line comprises: a memory for storing information on respective output formats corresponding to the possible output device(s) connected to the ECR, a search-reader for searching through the memory for specified output device(s) and for reading information on an output format for the specified output device(s), and an output data editor for editing output data according to the information read by the search-reader in response to: (a) an output demand for the ECR and (b) a predetermined editing rule which uses the read information.

9 Claims, 8 Drawing Sheets

$L_1 + R_1 \geqq W$

FIG. 6(b)

$L_1 + L_2 + \cdots + L_n > W$

FIG. 6(d)

$R_1 + R_2 + \cdots + R_n > W$

ELECTRONIC CASH REGISTER FOR USE WITH A PLURALITY OF OUTPUT DEVICES HAVING DIFFERENT OUTPUT FORMATS

FIELD OF THE INVENTION

The present invention relates to an electronic cash register and more particularly to an electronic cash register which is adaptable to varying output formats according to different models of output devices (printer, display, etc.) connected thereto.

BACKGROUND OF THE INVENTION

The electronic cash register (hereinafter referred to briefly as ECR) is generally connected to a printer and a display as standard output devices which respectively print out and display output data.

Meanwhile, for a change in specification or an improvement in function of an ECR, it is sometimes practiced to replace the existing printer and display devices with other models of such devices or connect other additional devices. In such cases, on the part of the ECR, it is common practice to additionally mount a software enabling the ECR to adapt itself to the output format of the newly connected output device and execute the output processing operation according to the new software. When it is impossible to mount such a new software for reasons of the limited memory capacity of the ECR, the existing software is dismounted and the new software Is mounted instead.

However, the practice of replacing the existing software with a new one for adapting the ECR to the new output device has the drawback that much time and cost are incurred for the preparation of the new software. This problem is particularly serious when the change of output devices is frequent or when the same change is made for a plurality of ECRs and this means an inevitable increase in the price of the ECR (inclusive of the software). Thus, the above practice is not an effective approach to the problem.

It is, therefore, an object of the present invention to provide an electronic cash register capable of adapting itself to changes in output format due to change of associated output devices (printer and display devices) without requiring change of the software.

Other objects and advantages of the invention will become apparent from the following description and accompanying drawings.

SUMMARY OF THE INVENTION

The ECR according to the present invention is an electronic cash register which can adjust itself to change of associated output devices and, more particularly, is an electronic cash register comprising a memory means for storing information relating to output formats corresponding to different models of output devices, a model designating means which specifies the model of associated output device, a search-reader means for searching said memory means and reading out information on the corresponding output format, and an output data editing means responsive to a demand for output and adapted to edit data for output according to said output format information read by said search-reader means and a predetermined editing rule.

The electronic cash register of the invention, which has the above general architecture, does not require change of the mounted software but permits editing of data with flexibility by adapting itself to a change in output format due to change in the model of associated output device (printer or display).

DETAILED DESCRIPTION OF THE PREFERRED EMBODIMENTS

One preferred embodiment of the present invention is described in detail below with reference to the accompanying drawings.

In the following description of the ECR, it is assumed that a printer and a display unit are connected thereto as output devices.

It is further assumed that the ECR is connected to one unit each of such printer and display but it is possible to connect the ECR to a plurality of output devices of each kind.

Figure 1:
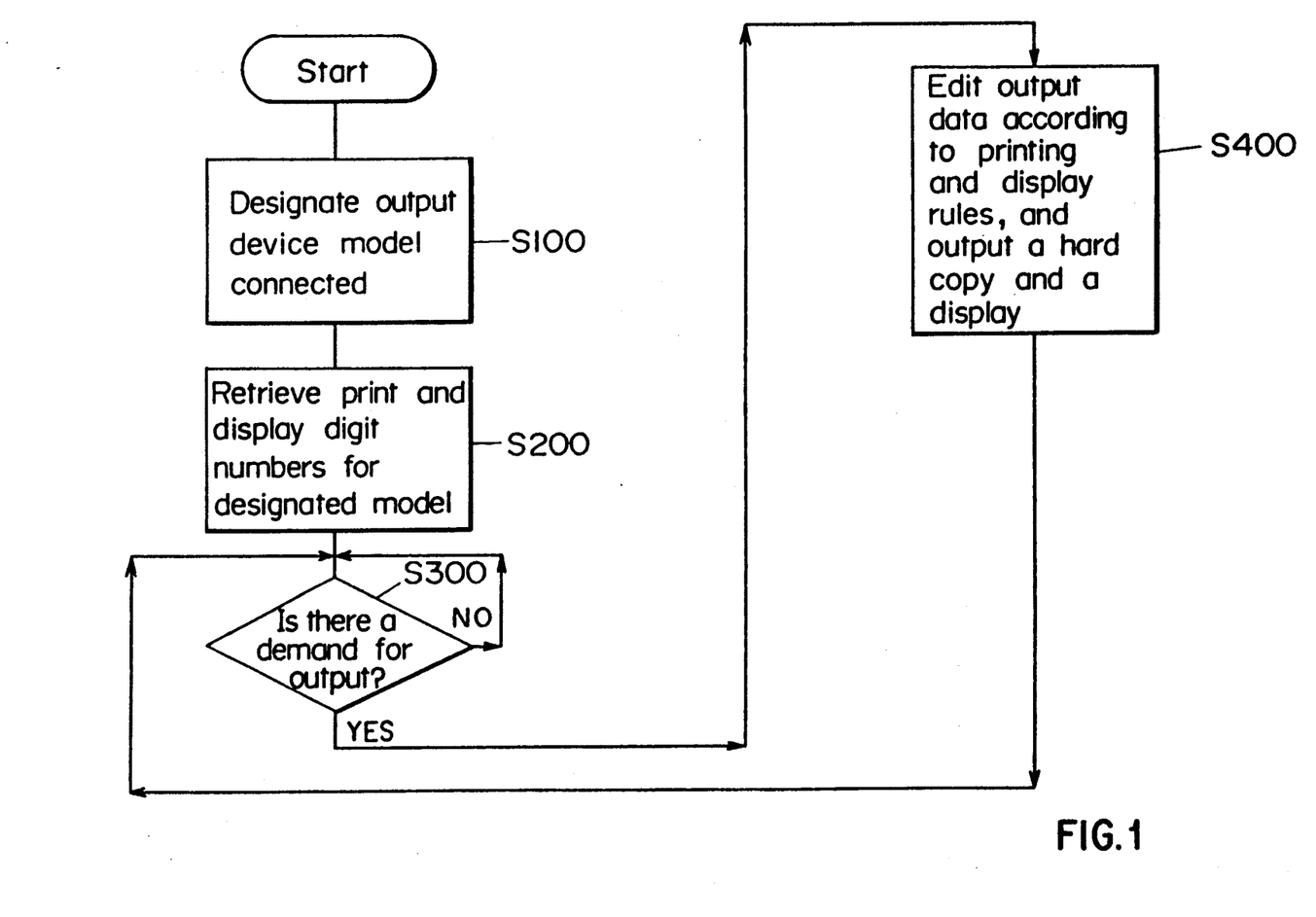
FIG. 1 is a schematic processing flow diagram showing the output operation of an ECR embodying the principle of the invention.

FIG. 1 is a generalized processing flow diagram showing an ECR 100 outputting data through the associated output devices in one embodiment of the invention.

Figure 2:
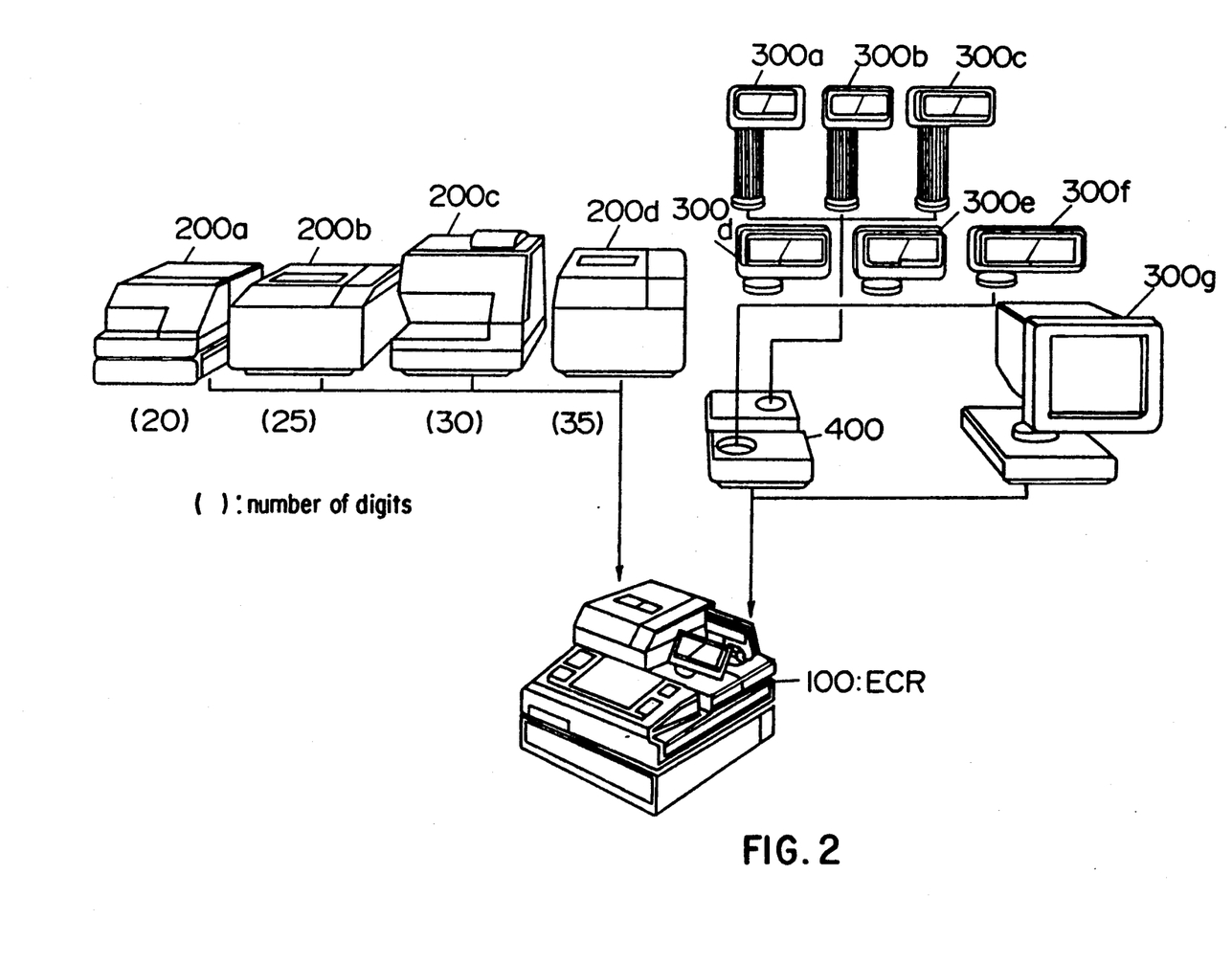
FIG. 2 is a schematic diagram illustrating output devices that can be connected to an ECR embodying the invention.

FIG. 2 is a schematic view explaining the output devices which can be connected to the ECR 100 in one embodiment of the invention.

Figures 3, 4:
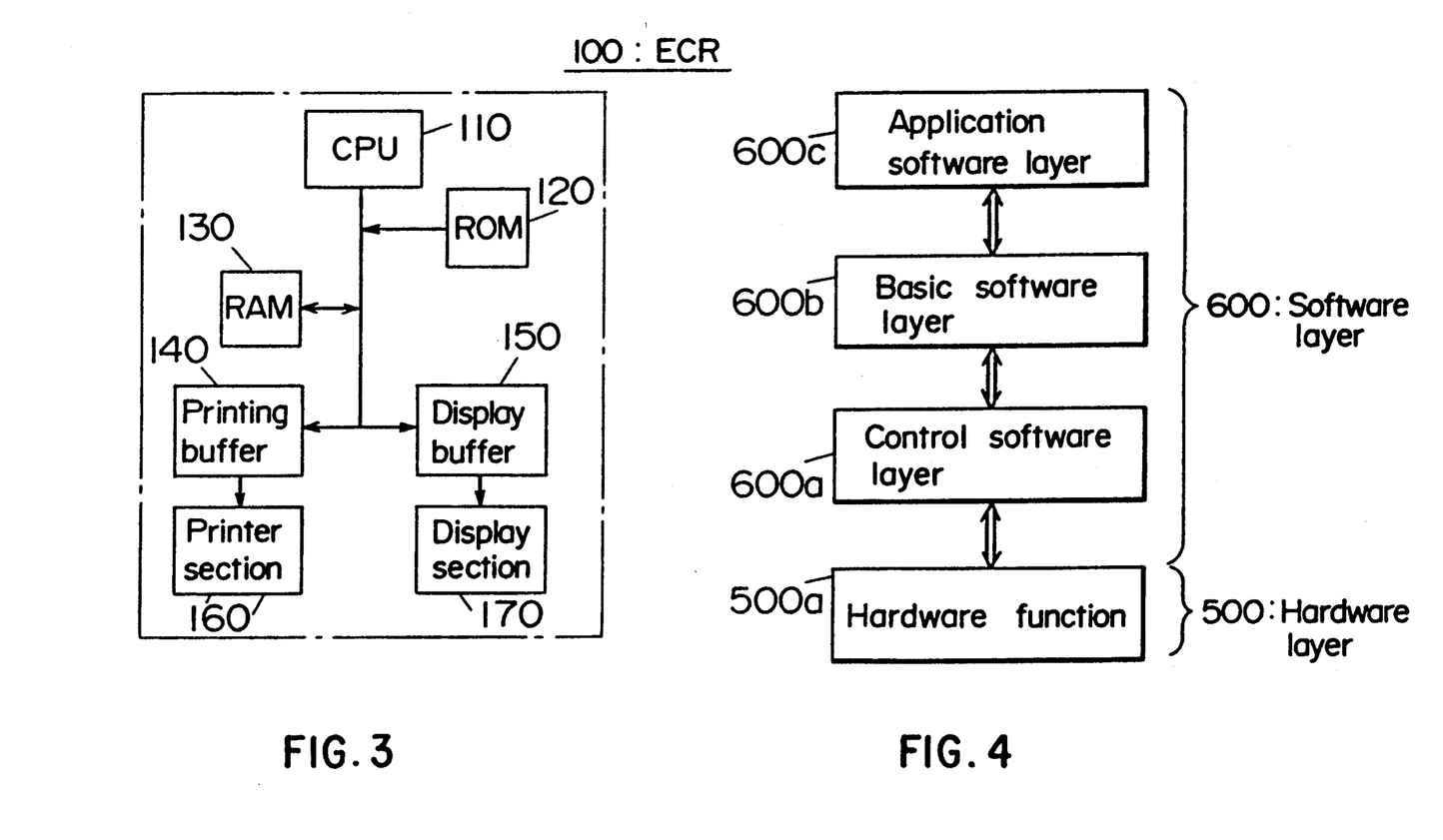
FIG. 3 is a schematic diagram showing the internal configuration of the ECR shown in FIG. 2.
FIG. 4 is a schematic diagram illustrating the hardware and software interfaces of the ECR shown in FIG. 2.

FIG. 3 is a schematic diagram showing the internal functional configuration of the ECR 100 shown in FIG. 2.

As shown in FIG. 2, the ECR 100 accepts any one or more of printers 200a through 200d which are dissimilar in the number of printing digits per line and any one or more of displays 300a through 300g which are dissimilar in the number of display digits per line.

For example, the number of printing digits of the printer 200a is 20, that of the printer 200b is 25, that of the printer 200c is 30, and that of the printer 200d is 35. The displays 300a through 300c are customer displays, the displays 300d through 300f are operator displays, and the display 300g is a cathode-ray tube (CRT) display.

The displays 300a through 300f are connected to the ECR 100 through a display board 400.

As shown in FIG. 2, the output data from the ECR 100 are fed to printers 200a through 200d for printing and to displays 300a through 300g for display.

The internal functional configuration of the ECR 100 shown in FIG. 2 is now explained with reference to FIG. 3.

Referring to FIG. 3, the ECR 100 includes a central processing unit (CPU) 110 which controls and monitors the operation of the ECR 100, a read-only memory (ROM) 120 and a random access memory (RAM) 130 for storing data (inclusive of programs) necessary for the operation of the ECR 100, a printing buffer 140, a display buffer 150 and a printing section 160 and a display section 170.

The printing section 160 includes one or more of the printers 200a through 200d which are shown in FIG. 2 and the display section 170 similarly includes one or More of the displays 300a through 300g shown in FIG. 2. The data to be fed to these output devices are temporarily stored in the printing buffer 140 and display buffer 150, respectively, for respective outputs in the forms of hard copy and visual display through said printing section 160 and display section 170.

In the functional configuration of the ECR100 presented in FIG. 2, the data input function is not shown, nor is described herein.

The interfaces for the hardware and software to be mounted on the ECR 100 are described below.

FIG. 4 is a schematic diagram showing the hardware and software interfaces of the ECR 100.

As illustrated, the hardware and software of the ECR 100 form a laminar interface, with a hardware layer 500 forming a substratum and a software layer 600 being superimposed thereon.

The hardware layer 500 comprises the complete hardware function 500a encompassing the peripheral devices of the ECR 100.

The software layer 600 comprises a software layer for control over the operation of said hardware function 500a (hereinafter referred to as the control software layer), an application software layer 600c which includes an application software prepared by the user, and a software layer 600b providing a variety of utility processing and other services necessary for said application software layer 600c (hereinafter referred to as the basic software layer).

The processing flow shown in FIG. 1 is included as a program in said basic software layer 600b, and the programs contained in said control software layer 600a and basic software layer 600b are written, as resident programs, into the ROM 120.

Thus, the application program prepared by the user is subject to the control software layer 600a and basic software layer 600b, so that various output devices of the ECR100 can be utilized via the hardware function 500a.

Figure 5:
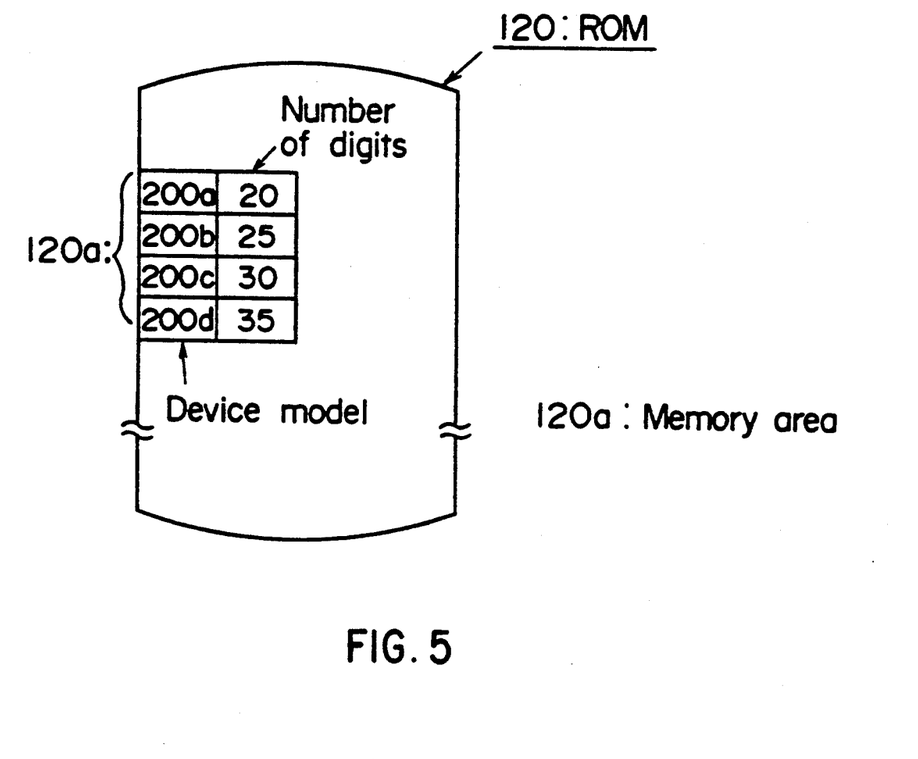
FIG. 5 is a schematic diagram showing the storage area for storage of printing digit data dependent on printer models in the ROM of the ECR shown in FIG. 3.

FIG. 5 is a schematic diagram showing the configuration of a storage area 120a for storing printer model-dependent printing digit data in the ROM 120 illustrated in FIG. 3.

As shown, this storage area 120a constituting a part of the ROM 120 is previously supplied with the numbers of printing digits which are dependent solely on printer models which can be connected to the ECR100.

More particularly, the numbers of printing digits corresponding to the respective printers 200a through 200d shown in FIG. 2, namely 20, 23, 30 and 35, are stored in the order mentioned.

Similarly for the displays 300a through 300g which can be connected to the ECR 100, the numbers of display digits corresponding to the respective displays are previously stored, although these are neither illustrated nor described in further detail.

The ECR 100 is previously provided with a printing rule and a display rule, both of which are designed for universal application regardless of models of output devices. Thus, the ECR 100 upon specification of a given model of output device edits and outputs data in an output format corresponding to the specified model in accordance with said printing or display rule.

The printing rule and display rule mentioned above are described in detail below.

FIG. 6(a) through (f) are schematic views explaining the printing rule employed in one preferred embodiment of the invention.

Figure 6A:
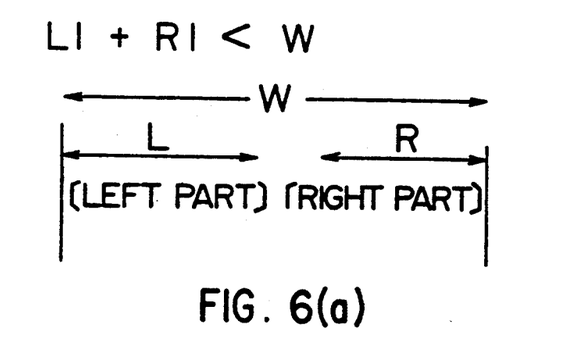
FIG. 6(a) through (f) are schematic diagrams showing the printing rule embodying the principle of the invention.
Figure 6B:
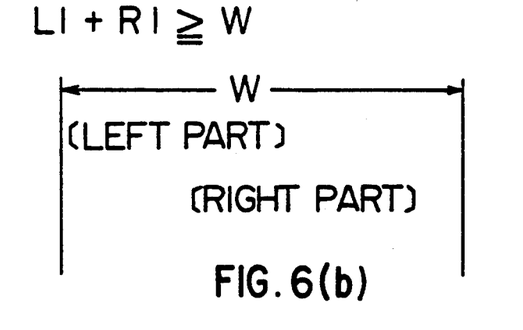

Here it is assumed that the number of printing digits per line is W digits and that each line consists of a right part R and a left part L.

As shown in FIG. 6(a), generally when the number of characters L1 available in the left part L and the number of characters R1 available in the right part R satisfy the relation (W>L1+R1), printing in the left part L is left-justified and that in the right part R is right-justified.

On the other hand, if the relation (W≦L1+R1) holds true, printing is done in two lines with the left part L being left-justified and the right part R arranged below said L and right-justified as shown in FIG. 6 (b).

The above is a general printing rule. The printing rule applicable to the left part L is now described.

Figure 6C:
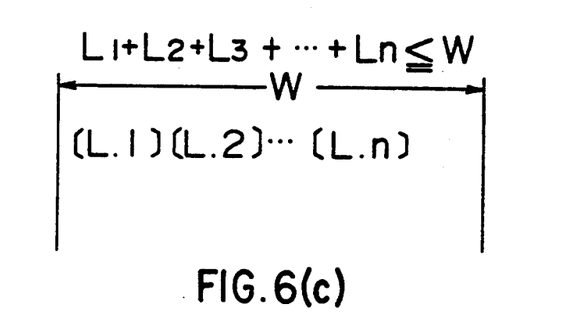

Referring to FIG. 6(c) showing the printing rule applicable to the left part L, this left part L is further divided into [L.1], [L.2], . . . , [L.n]. The number of characters in the part [L.i] is assumed to be Li (hereinafter, i=1, 2, 3, . . . , n). Now, if the relation $L_1+L_2+ \ldots L_n \leq W$ holds true, printing is carried out in one line with the left part L being left-justified.

Figure 6D:
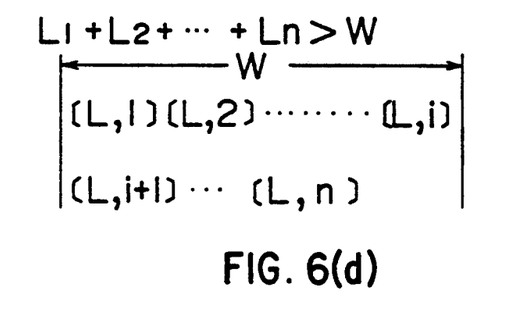

On the other hand, if the relation is $L_1+L_2+ \ldots +L_n > W$, printing is done in two lines with the left part L being left-justified, as shown in FIG. 6(d).

The printing rule applicable to the right part R is now explained.

Figure 6E:
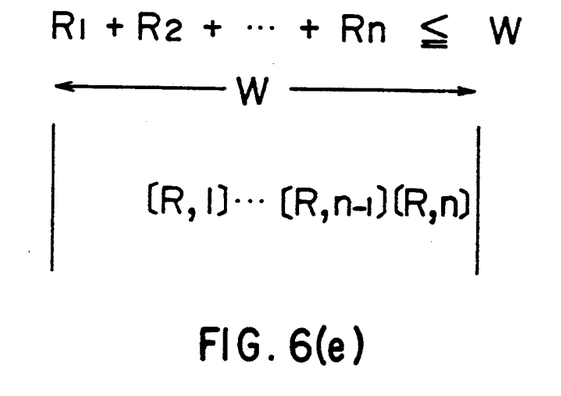

Referring to FIG. 6(e) which shows the printing rule applicable to the right part R, the right part R is subdivided into [R.1], [R.2], . . . , [R.n] and the number of characters per [R.n] is assumed to be Rn. Then, if the relation $R_1+R_2 \ldots +R_n \leq W$ holds true, printing is performed in one line with the right part R being right-justified.

Figure 6F:
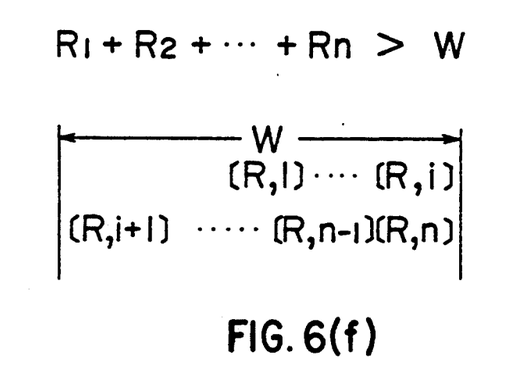

On the other hand, if $R_1+R_2+ \ldots +R_n > W$, printing is done in two lines with the right part R being right-justified as shown in FIG. 6(f).

The above is an explanation of the printing rule applicable to printers 200a through 200d which can be connected to the ECR100. The display rule applicable to displays 300a through 300g is now described.

Figure 7:
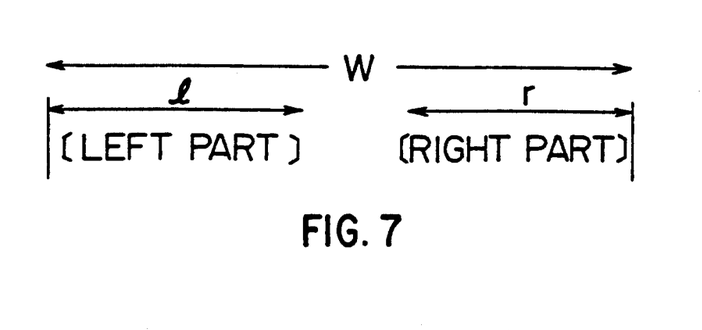
FIG. 7 is a schematic diagram explaining the display rule embodying the principle of the invention.

FIG. 7 is a schematic diagram illustrating the display rule employed in one embodiment of the invention.

Let it be assumed that the number of display digits per line is w and the display per line consists of a left part l and a right part r. Referring to FIG. 7, if there holds the relation (w≧l1+r1+1) where l1 is the number of display characters in the left part l and r1 is that in the right part r, both parts of data are displayed concurrently in one line with the left part l being left-justified and the right part r right-justified.

On the other hand, if the relation $(w<ll+rl+1)$ holds true, it is impossible to display the left part l and right part r concurrently in a single line. Therefore, the left part l is first displayed and, then, the display of the right part r begins to take place. However, if either the left part l or the right part r is to be displayed beyond the right-hand frame of the display, the continued display takes place from the left-hand end. That is to say, the right part r is displayed over the left part l, for instance.

Thus, the ECR 100 is provided with the above printing and display rules. Now, how the data according to the user's application program (hereinafter referred to as designated print/display-data PD) is printed according to said printing rule is explained below. The mode of display according to said display rule is not described.

Figure 8:
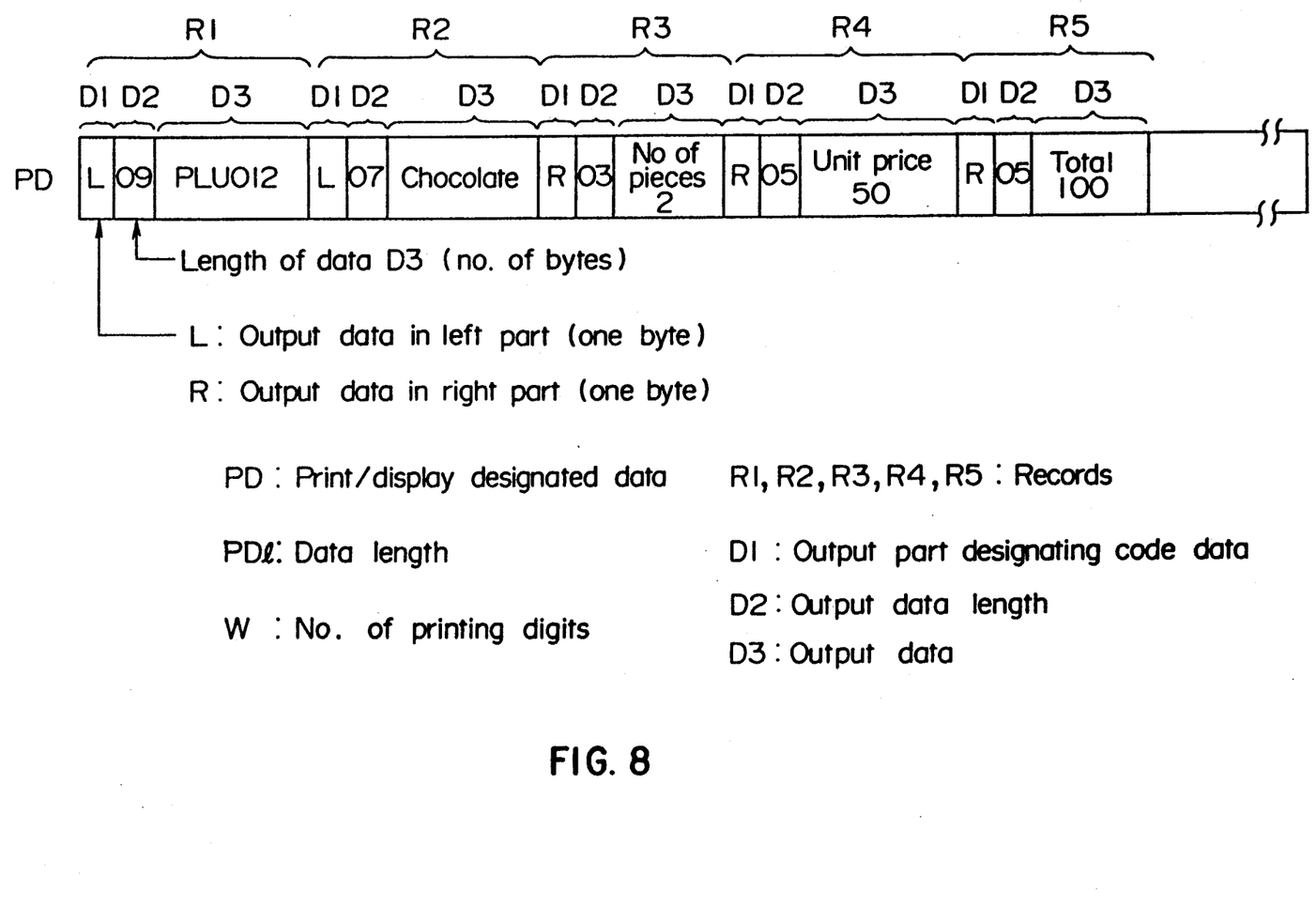
FIG. 8 is a schematic diagram showing the configuration of designated print/display data embodying the principle of the invention.

FIG. 8 is a schematic diagram showing the configuration of designated print/display data PD in one embodiment of the invention.

As shown, the designated print/display data PD has a predetermined data length PDl and all the data are registered as left-justified.

The designated print/display data PD shown in a data set including variable length records R1 through R5 and said respective records R1 through R5 contain three data items.

With regard to the first data items of said three items, the output data D3 to be registered in this record (which is described later) is registered in the left part, or the output part designating code data D1 which specifies the data to be displayed and printed is registered in the right part. In the second data item, an output data length D2 indicating the length (number of bytes) of output data D3 to be recorded in the record is registered. In the third data item, the output data D3 to be recorded in the record is registered.

Therefore, the output data D3 of the first record R1 in the designated print/display data PD shown in FIG. 8, for instance, is as long as 9 bytes and the data to be printed or displayed is in the left part L.

While the designated print/display data PD shown in FIG. 8 contains records R1 through R5, the number of records that can be registered is not limited unless the data length PDl is exceeded.

FIG. 9(a) through (d) are schematic diagrams showing the prints obtained by editing the designated print/display data PD of FIG. 8 in accordance with the printing rule shown in FIGS. 6(a) through (f).

Figure 9A:
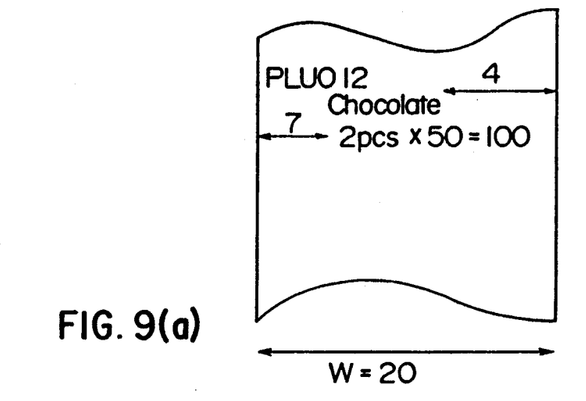
FIG. 9(a) through (d) are schematic diagrams showing the prints obtained by editing the designated print/display data of FIG. 8 according to the printing rule shown in FIG. 6(a) through (f).

FIG. 9(a) is a schematic diagram of the print obtained by editing the designated print/display data PD according to the printing rule with the printer 200a with a number of printing digits per line of W=20 digits.

Figure 9B:
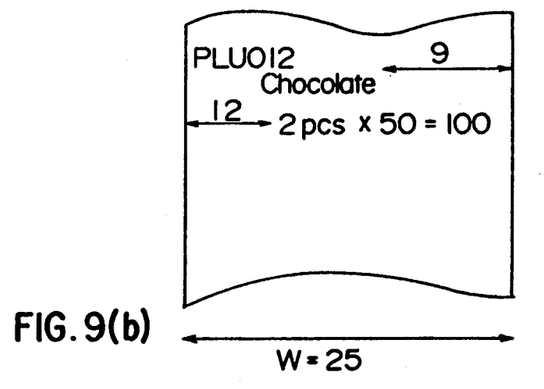

FIG. 9(b) is a schematic diagram showing the print obtained by editing the designated print/display data PD according to the printing rule with the printer 200b having a number of printing digits per line of W=25.

Figure 9C:
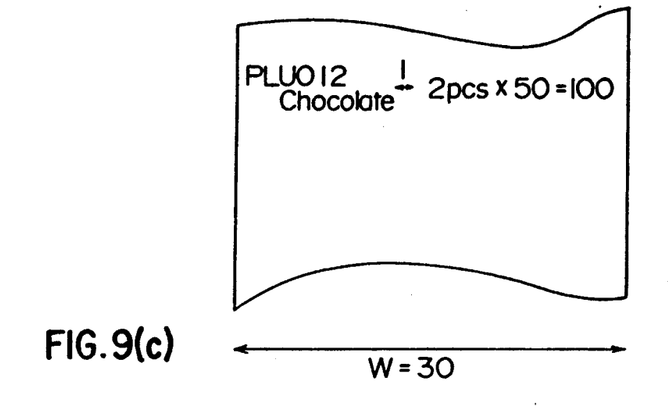

FIG. 9(c) is a schematic diagram showing the print obtained by editing the designated print/display data PD according to the printing rule with the printer 200c having a number of printing digits per line of W=30.

Figure 9D:
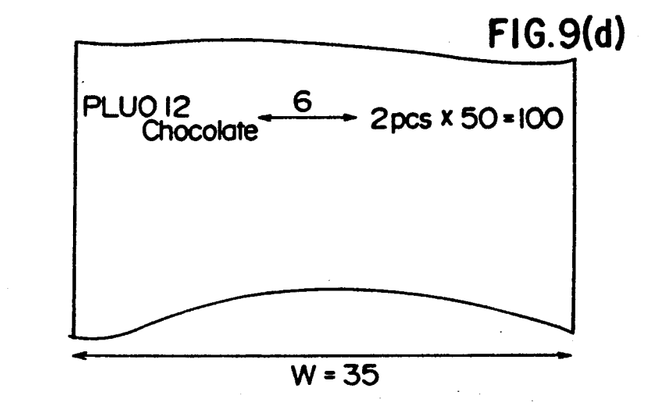

FIG. 9(d) is a schematic diagram showing the print obtained by editing the designated print/display data PD according to the printing rule with the printer 200d having a number of printing digits per line of W=35.

As illustrated in FIG. 9(a) through (d), it is clear that even if the number of printing digits is varied, that is to say irrespective of printer model, the use of said printing rule permits the editing and printing of the same designated print/display data PD in a format corresponding to the particular number of printing digits W, that is to say the particular printer model.

The details of the printing and display operations of the ECR100 are now described with reference to FIGS. 1 thorough 9.

The ECR 100 is assumed to be connected to one of said printers 200a through 200d and to one of said displays 300a through 300d.

Stored in the storage area 120a of the ROM120 are printing digit data W corresponding to printers 200a through 200d which can be connected (FIG. 5). Similarly display digit date w corresponding to connectable displays 300a through 300g are stored in another storage area of the ROM 120 (pig. 5).

While the ECR 100 gives outputs (print and display) during the routine transaction, this action is initiated as the designated print/display data PD is generated from the user's application program and a demand for output is made.

As the ECR 100 is initialized by switching its power supply on, the CPU 110 enquires about the models of the printer and display connected at step S100 as shown in FIG. 1. The model of the output device is ascertained from the state of a signal input from the terminal for connection of the printer or the terminal for connection of the display.

In response to this specification of printer and display models connected, the CPU110 proceeds to the next step S200.

At S200, using the device model code specified at S 100 as the key, the corresponding storage area is searched to read the printing digit data W and display digit data w corresponding to the respective device models. Thus, the storage area 120a of the ROM120 shown in FIG. 5 is searched using the specified device model code as the key in the normal order to read out the corresponding printing digits data W. Similarly, the display digit data w is read out.

In this manner, as the ECR 100 is initialized (this occurs whenever a peripheral device is exchanged), the models of the printer and display connected are specified and the printing digit data w and display digit data w are determined. The printing digit data W and display digit data w are temporarily stored in predetermined storage areas of the RAM130 until the next initialization.

At the next step S300, the CPU 110 enquires whether it is receiving a printing or display output demand signal according to the user's application program.

As the output demand signal is received at S300, the sequence proceeds to the next step S400. However, until reception of said demand signal, the CPU110 repeats the enquiry at S300.

As the sequence proceeds to S400, the printing and display processings are carried out. More particularly, the output demand signal is followed by said designated print/display data PD from the user's application program and therefore, the CPU110 edits the designated print/display data PD in accordance with the aforesaid printing rule and printing digit data W. The printing data thus edited is temporarily stored in a printing buffer 140 and fed to a printer connected to a printing section 160. In parallel with the above operation, display data edited according to the display digit data w and said display rule is similarly stored temporarily in a display buffer 150 and fed to a display connected to a display section 170.

Then, the sequence returns to S300 and the output processing in response to the output demand signal from the application program is carried out in the same manner as above.

The processing routine illustrated in FIG. 1 unconditionally ends upon completion of all the transactions of the ECR100 or upon termination of power supply from the power source.

Thus, even if a change is made in the model of the printer or display connected to the ECR 100, the model is specified and the display digit information w and printing digit information W are specified. Then, the designated print/display data PD are edited in accordance with the printing rule and display rule registered in the basic software layer 600b.

Therefore, even if the printer or display is exchanged, it is no longer necessary to modify or make an addition to the existing software. Thus, as shown in FIG. 4, the upper application software layer 600c need not care about the output devices to be connected to the ECR 100 and the application program functions as a universal program for output devices. In addition to the above-mentioned advantage that the software need not be modified, the invention offers the advantage of savings in the time and cost of software maintenance that might be required due to change of output devices.

The above description and the accompanying drawings are merely illustrative of a few modes of application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. An electronic cash register for use with a plurality of output devices having respective output formats, said electronic cash register comprising:

memory means for storing information on respective output formats corresponding to said plurality of different output devices, model designating means for specifying one or more output devices connected with said cash register, a search-reader for searching through said memory means for information concerning said respective output formats of each output device specified by said model designating means and reading said information for each specified output device; and, an output data editing means for editing output data according to the information read by said search-reader in response to an output demand and at least one predetermined editing rule which uses the read information.

2. An electronic cash register as in claim 1, wherein each of said plurality of output devices has a respective capability of outputting a number of characters per line and said memory means stores, for each of said plurality of output devices, respective information on the number of characters per line which can be output by the device.

3. An electronic cash register as in claim 2, wherein at least some of said output devices are printers and said information represents the number of characters per line which can be printed.

4. An electronic cash register as in claim 2, wherein at least some of said output devices are display devices and said information represents the number of characters per line which can be displayed.

5. An electronic cash register as in claim 2, wherein said predetermined editing rule uses stored information concerning the number of characters per line (W) of an output device to properly justify portions of said output data.

6. An electronic cash register as in claim 5, wherein at least a portion of said output data is left part data (L1) and at least a portion of said output data is right part data (R1), and said rule includes the rule that when $W > L1 + R1^{+x}$, where $x=0$ or a positive integer, said left part data is output as left justified and said right part data is output as right justified.

7. An electronic cash register as in claim 6, wherein said rule includes the rule that when $W \leq L1 + R1^{+x}$ the output data is split onto two lines with the left part data (L1) being left-justified on one line and the right part data (R1) being right-justified on another line.

8. An electronic cash register as in claim 7, wherein said left part data L1 is further dividable into a number of characters $L_1, L_2 \ldots L_N$ and said rule further includes the rule that when $L_1 + L_2 + \ldots L_N^{+x} \leq W$, where $x=0$ or a positive integer, the output of said left part data L1 is outputted on one line and is left justified, whereas if $L_1 + L_2 + \ldots L_N^{+x} > W$, the output of said left part data (L1) is output on two lines with said left part data being left justified on both lines.

9. An electronics cash register as in claim 7, wherein said right part data (R1) is further dividable into a number of characters $R_1, R_2 \ldots R_N$, and said rule further includes the rule that when $R^1 + R^2 \ldots + R^N + x \leq W$, where $x=0$ or a positive integer, the output of said right part data is on one line which is right justified, whereas when $R_1 + R_2 + \ldots R_N^{+x} > W$, where $x=0$ or a positive integer, the output of said right part data is on two lines with each line being right justified.

* * * * *